United States Patent Office 3,497,421
Patented Feb. 24, 1970

3,497,421
SHIELDED ENCLOSURE PROVIDING RESISTANCE TO HIGH TEMPERATURES AND PRESSURES
Paul Thome, Saint Cloud, France, assignor to Commissariat a l'Energie Atomique, Paris, France
Filed Jan. 15, 1968, Ser. No. 698,033
Int. Cl. G21c 11/00, 11/08
U.S. Cl. 176—87
7 Claims

ABSTRACT OF THE DISCLOSURE

A closed impervious wall covered externally with a removable heat insulator is disposed within a pressure vessel which is covered internally with a leak-tight lining membrane. The wall contains the active portion of the reactor and delimits with the lining membrane a space of relatively large size which is protected from the heat by the heat insulator and filled with a neutron-absorption liquid which can readily be discharged. An operator can therefore penetrate into the reactor vessel a short time after shutdown in order to carry out surveys and any repair work on the lining membrane and impervious wall which may prove necessary. Leak-tightness of the reactor is thus ensured.

---

The present invention relates to shielded enclosures which afford resistance to high temperatures and pressures and which have many potential applications but are primarily of interest as nuclear reactor containment structures.

In fact, containment structures of the type at present employed in nuclear reactors comprise a pressure vessel constructed of biological shielding material which is intended to afford resistance to high internal pressures and usually consists of prestressed concrete, said pressure vessel being fitted with a leak-tight lining membrane so as to form a chamber which contains the reactor core and, in the case of reactors with integrated heat exchangers, also contains the circulation system for cooling the core.

Good operation of the internal elements of the pressure vessel and especially of the lining membrane is of primary importance since even the smallest leak is liable to cause rapid damage to the pressure vessel and to result in a loss of fluid which is sometimes very costly, e.g. heavy water, as well as in contamination of surrounding premises. In point of fact, access to said lining membrane as well as to the other elements located within a highly active zone is usually impossible in reactors which are at present known either as a result of a high level of activity or as a result of lack of total accessibility when heat-insulating material is applied against said lining membrane. In reactors of this type, neither inspection and survey work nor rapid partial repair work can therefore be contemplated.

The aim of this invention is to circumvent this disadvantage and to permit maintenance of the internal elements of a shielded enclosure as well as servicing operations which, in the case of a nuclear reactor containment vessel, can readily be carried out within said vessel in a very short time after reactor shutdown.

This invention is directed to a shielded enclosure which affords resistance to high temperatures and pressures, which is primarily intended for a nuclear reactor and which comprises a pressure vessel constructed of biological shielding material, such as prestressed concrete, a leak-tight lining membrane which covers the internal wall of said vessel, an impervious wall which is parallel to said lining membrane, a useful chamber enclosed within said wall, a servicing space between said wall and said lining membrane, a heat insulator removably fixed externally of said wall within said servicing space, means for introducing a cooling and neutron-absorbing liquid within said space which is maintained at a pressure of similar value to that which prevails within the chamber when said chamber is at a high pressure, means for discharging said liquid when the chamber is depressurized for servicing purposes, and in each end-wall of the pressure vessel at least one opening which provides access to the emptied space and which is closed by a removable seal plug.

The space between the membrane and the wall is of sufficient size to permit entry of operating personnel without thereby entailing any complex dismantling operations, provision being made if necessary for protection of personnel on entry by means of a suitable neutron shield; repair work can even be performed from said space. In the case of a nuclear reactor, said space is additionally isolated from the active zone of the reactor core and can in particular be filled with a neutron-absorbing liquid, thereby preventing any high residual activity after said liquid has been discharged. An operator can therefore penetrate into said space practically as soon as the reactor is shut down.

The reactor containment structure and especially the membrane and wall can thus be inspected at regular intervals and maintained in good operating condition.

A number of other properties and advantages of the present invention will in any case become apparent from the following detailed description of one embodiment which is given by way of non-limitative example and illustrated in the accompanying drawings, in which.

Figure 1:
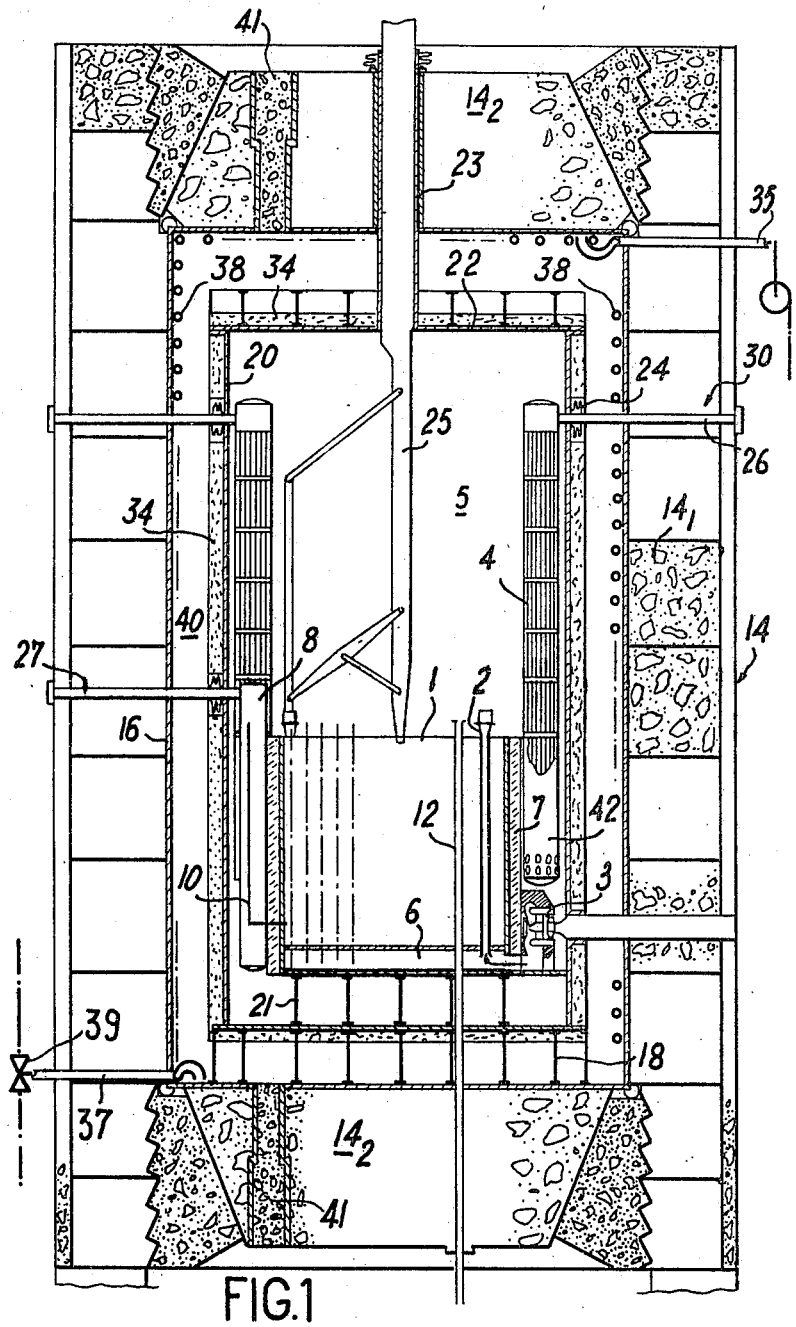
FIG. 1 is a longitudinal sectional view of a nuclear reactor wihch is provided with a shielded enclosure or containment structure in accordance with the invention.

The reactor under consideration is of the integrated heat exchanger type which is moderated and cooled by a liquid such as heavy water. It will be understood that this type of reactor has been chosen only by way of explanatory illustration and that the invention extends to all types of encolsures which are intended to be subjected to high temperatures and pressures and especially to containment vessels of reactors other than those of the type herein described.

The reactor which is illustrated in the accompanying drawings comprises a tank 1 which is filled with neutron-moderating liquid such as heavy water, for example. Said moderator tank is traversed by calandria tubes 2 which contain the fuel element whilst a cooling liquid which is also heavy water is circulated through said tubes, and also by guide tubes 12 for the penetration of the control rods and safety rods.

Beneath said moderator tank, the tubes 2 open into a coolant inlet manifold 6 which communicates with the delivery of a pump 3, said pump being mounted on the side of the tank 1 near the bottom of the latter.

Heat exchangers 4 are placed in a ring around the moderator tank 1 and within the space 5 above said tank, a separation between said heat exchangers and said tank being provided by lateral shield plates 7. Said heat exchangers communicate on the one hand with said space 5 and on the other hand with the pump 3 through which the liquid discharged from said heat exchangers is delivered towards the inlet manifold 6.

There is also mounted around the tank 1 a circuit 8 for cooling the moderator which, in this example, is at a lower temperature than the fluid at the inlet of the manifold 6. This special heat exchanger draws off the fluid as it is delivered from the pump 3 and discharges it through the pipe 10 at the bottom of the tank into the moderator.

When the reactor is in operation, the coolant which is heated by the fuel elements contained in the calandria tubes 2 reaches the boiling point. The vapor produced escapes into the space 5 above the moderator tank 1 in which said vapor condenses in the heat exchangers 4. The liquid continues to cool in the immersed portion 42 of the heat exchanger 4, is then collected by the pump 3 and returned through the manifold 6 into the calandria tubes 2.

The complete assembly consisting of moderator tank 1, core-cooling circuit and moderator cooling circuit is placed at the center of a shielded enclosure or containment structure comprising a prestressed concrete pressure vessel 14 formed in the case of the figure by a cylinder $14_1$ which is closed at each end by two removable seal plugs $14_2$, the internal wall of said vessel being lined with a leak-tight membrane 16.

Within the interior of said vessel and in parallel relation with said lining membrane 16 but separated from this latter by a space 40 of relatively substantial size, there is mounted on a diagrid 18 an impervious wall or lining membrane 20 forming an inner containment which surrounds the core assembly and cooling circuit and is constituted by a cylinder having a base on which the moderator tank 1 is supported by a diagrid 21 whilst the top of said cylinder is closed by a cover 22 formed of the same material and welded, for example, to the cylinder which permits the assembly of the reactor core and heat exchangers. In the embodiment which is illustrated, both the cover 22 and the top seal plug $14_2$ of the pressure vessel are pierced by a central opening 23 which provides a passageway for the members which serve to couple a refueling machine 25 disposed within the space 5 with units which are located outside the pressure vessel and which are intended to drive said machine 25, and to withdraw this latter from the pressure vessel if necessary. Provision can also be made for peripheral openings (not shown in the drawings).

The impervious membrane 20 is pierced by lateral openings 24 for the insertion of tubes 26, 27 for the inlet and outlet of the secondary heat-removal circuit, expansion compensators 28 being mounted around said openings and fixed in leak-tight manner on the tubes.

Figure 2:
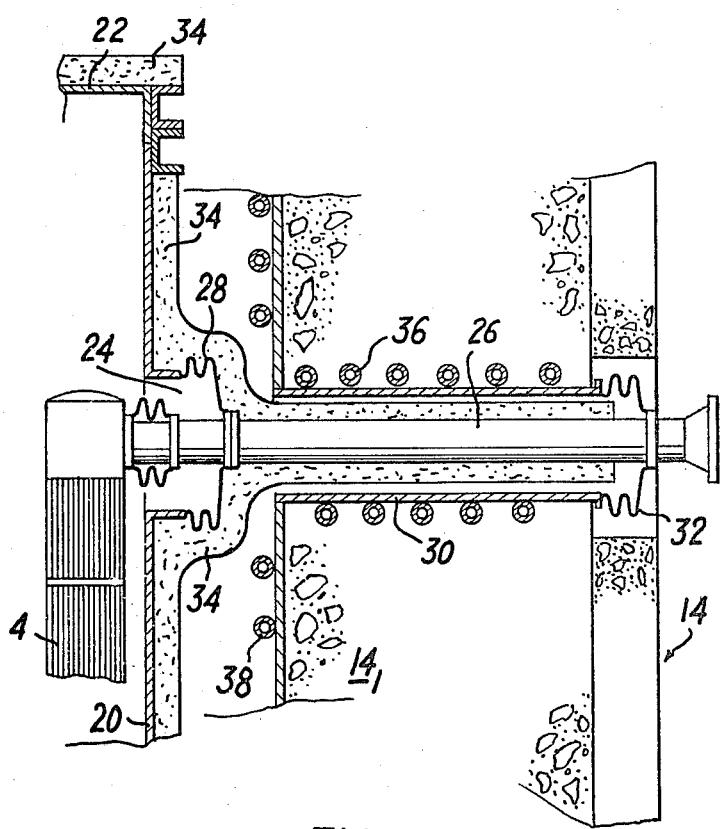
FIG. 2 is another sectional view on a larger scale showing a detail of construction of said reactor containment structure.

The tubes 26, 27 referred-to are also mounted coaxially within tubes 30 (as shown in FIG. 2) which provide penetrations through the pressure vessel 14, a bellows seal 32 being mounted between the through-tube 30 and the outer wall of the pressure vessel.

On the outer wall which faces opposite to the membrane, 16, the wall 20 is adapted to carry a heat insulator 34 which can be formed of metallic or ceramic fibers or sheets, e.g. juxtaposed stacks of metal plates applied against the container wall 20 by means of threaded studs or screws.

A heat insulator of the same type as the material which is thus fixed around the membrane 20 both on the cylindrical portion and on the cover 22 is also mounted on the expansion compensators 28 and around the tubes 26, 27 inside the trough-tubes 30. A coil 36 through which is circulated a fluid for cooling the pressure vessel can in addition be mounted around said trough-tubes 30 within the concrete structure.

The heat-insulating element 34 is immersed in a neutron-absorbing liquid such as light water which completely fills the space 40 between the two lining membranes 16 and 20. For this purpose, a pipe 37 connects the bottom of the space 40 either to a supply system located outside the pressure vessel or to a circulation system for the discharge of said liquid, by means of a valve 39. The supply and discharge systems referred-to are of known types and have not been shown for the sake of clarity of the drawings. At the upper part of this space 40 a pipe 35 is provided for escaping of the air when the liquid is introduced or for supplying it when the liquid is discharged.

In order to prevent the lining membrane 20 from being subjected to excessive stresses, the neutron-absorbing liquid is maintained at a pressure which is similar to that which prevails inside said container 20, namely, to the pressure which prevails around the reactor core.

Balancing of pressures is carried out by means of a device of known type which has not been shown in the drawings.

No vapor is generated within the space 40, with the result that there does not take place any rapid convective flow of liquid and there does not exist any variable pressure gradient which is present in forced convection systems. The heat insulator, whose function is solely to arrest convective heat-transfer processes, can therefore be of very simple design. Any possible local destruction of the heat insulation is not liable to produce any adverse effects on the behavior of the containment structure and, in particular, does not give rise to any danger of formation of hot points on the lining membrane 16.

A circulation system 38 for cooling the lining membrane 16 may additionally be fixed on said membrane within the space 40 in order to prevent any dangerous overheating of the concrete. Said circulation system is also immersed in the light water which is contained in the space 40, thereby permitting of maximum heat extraction, enhanced resistance of the containment structure and an appreciable reduction in capital cost of the installation, the heavy water investment being reduced by means of the heat insulation 34 which is provided within the space 40.

The assembly which comprises the reactor core and circulation system for cooling the reactor, that is to say the active portion of the reactor, is thus fully isolated from the prestressed concrete pressure vessel and its lining membrane and the space 40 which is formed between the two lining membranes 16 and 20 is not in contact with the reactor coolant.

In addition, the liquid contained within said space 40 absorbs a substantial proportion of the heat and neutrons emanating from the reactor core and limits radioactivation of the lining membranes 16 and 20. Consequently, when the reactor is shut down, the container 20 depressurized and said liquid discharged, the residual activity and temperature within the space are of a low order and the space is thus available for almost immediate servicing.

The dimensions of the space 40 are additionally chosen in order to permit the penetration of suitable tools and even the entry of an operator who may thus inspect the wall and membrane or other components and undertake repair work if necessary. In particular, the heat insulator can thus be dismantled and replaced. In order to facilitate more complex repair work, the expansion compensators are preferably also removable.

Entry of operating personnel is made possible either by removal of one of the plugs $14_2$ or simply by withdrawal of the removable seal plug 41 which forms a manhole pierced in one of the end-walls of the pressure vessel.

The time of reactor shutdown is thus essentially limited by the duration of the servicing operations involved; periodic inspections can thus be carried out, good maintenance of reactor internals can be ensured and potential causes of accidents can consequently be removed.

Moreover, any leakage in the outer lining membrane 16 would only have minimum consequences by virtue of the fact that the impervious wall 20 ensures leak-tightness of the active portion and no highly radioactive fluid would be carried away by such leakage.

The combination of the wall and membrane and the presence of the servicing space accordingly make it possible to provide the reactor containment structure with a high degree of leak-tightness and also to maintain the reactor in good operating condition.

It is wholly apparent that a number of different modifications could be made in the form of construction which has just been described by way of example without thereby departing from the scope or the spirit of the invention.

What I claim is:

1. A shielded enclosure which affords resistance to high temperatures and pressures, which is primarily intended for a nuclear reactor and which comprises a pressure vessel consrtucted of biological shielding material of prestressed concrete, a leak-tight lining membrane which covers the internal face of said vessel, an impervious wall which is parallel to said lining membrane, a chamber enclosed within said wall, a servicing space between said wall and said lining membrane, a heat insulator removably fixed externally of said wall within said servicing space, means for introducing a cooling and neutron-absorbing liquid within said space which is maintained at a pressure of similar value to that which prevails within the chamber when said chamber is at a high pressure, means for discharging said liquid when the chamber is depressurized for servicing purposes, and in each end-wall of the pressure vessel at least one opening which provides access to the emptied space and which is normally closed by a removable seal plug.

2. A shielded enclosure according to claim 1, wherein the neutron-absorbing liquid is light water.

3. A shielded enclosure according to claim 1, wherein said enclosure comprises a cooling circuit fixed on the lining membrane which is carried by the pressure vessel inside the servicing space.

4. A shielded enclosure according to claim 1, wherein the inner impervious wall is constituted by a cylindrical container closed by a cover which is fixed in leak-tight manner, thereby defining the chamber.

5. A shielded enclosure according to claim 1, wherein the inner impervious wall is pierced by openings, tubes passing through the openings and through the pressure vessel and expansion compensators covered with heat-insulating material around said tubes.

6. A shielded enclosure according to claim 5, wherein the expansion compensators are removable.

7. A shielded enclosure for a liquid-moderated nuclear reactor, comprising within a prestressed concrete pressure vessel fitted with a lining membrane, an impervious wall forming a closed chamber which contains the moderator tank and delimits the core cooling circuit, said impervious wall being provided with openings for penetration of the pressure vessel which are fitted with expansion compensators, a servicing space between said wall and said lining membrane which is filled during reactor operation with a neutron-absorbing liquid, a heat insulator which is removably fixed externally of said wall within said servicing space, means for introducing the liquid within said space which is maintained at a pressure of similar value to that which prevails within the chamber when said chamber is at a high pressure, means for discharging said liquid when the reactor is depressurized for servicing, and in each end-wall of the pressure vessel at least one opening which provides access to said emptied space, which is normally closed by a removable seal plug.

References Cited
UNITED STATES PATENTS

| | | | |
|---|---|---|---|
| 3,357,890 | 12/1967 | Friis et al. | 176—87 |
| 3,301,320 | 1/1967 | Huntington | 165—136 |
| 2,975,115 | 3/1961 | Wigner et al. | 176—87 |

CARL D. QUARFORTH, Primary Examiner

HARVEY E. BEHREND, Assistant Examiner

U.S. Cl. XR

165—136